(12) United States Patent
Tremblay

(10) Patent No.: US 7,283,138 B2
(45) Date of Patent: Oct. 16, 2007

(54) METHOD, SOFTWARE AND APPARATUS FOR EFFICIENT POLYGON RENDERING

(75) Inventor: Christopher Tremblay, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 578 days.

(21) Appl. No.: 10/952,216

(22) Filed: Sep. 28, 2004

(65) Prior Publication Data

US 2006/0066620 A1    Mar. 30, 2006

(51) Int. Cl.
    *G06T 11/20* (2006.01)
(52) U.S. Cl. .................................................. 345/441
(58) Field of Classification Search ................. 345/441
    See application file for complete search history.

(56) References Cited

U.S. PATENT DOCUMENTS 5,287,436 A    2/1994  Fischer et al.
5,706,415 A *  1/1998  Kelley et al. ............... 345/426
6,628,281 B1 * 9/2003  Fossum et al. ............. 345/422

* cited by examiner

*Primary Examiner*—Ulka Chauhan
*Assistant Examiner*—Dan Washburn
(74) *Attorney, Agent, or Firm*—Randi L. Karpinia; Joseph T. Cygan

(57) ABSTRACT

One or more special merge vertices (1, 8) each of which is a root of two braches each including a monotonic (in respect to a particular coordinate) series of vertices are selected from an ordered arrangement of vertices (1-10) that defines a polygon (102). The special merge vertices (1, 8) can be sorted (according to the particular coordinate) so that they can be efficiently located when scanning through the polygon. In scanning through the polygon (102) in a process of rendering the polygon (102), the branches are used to demarcate boundaries of the polygon (102).

9 Claims, 4 Drawing Sheets

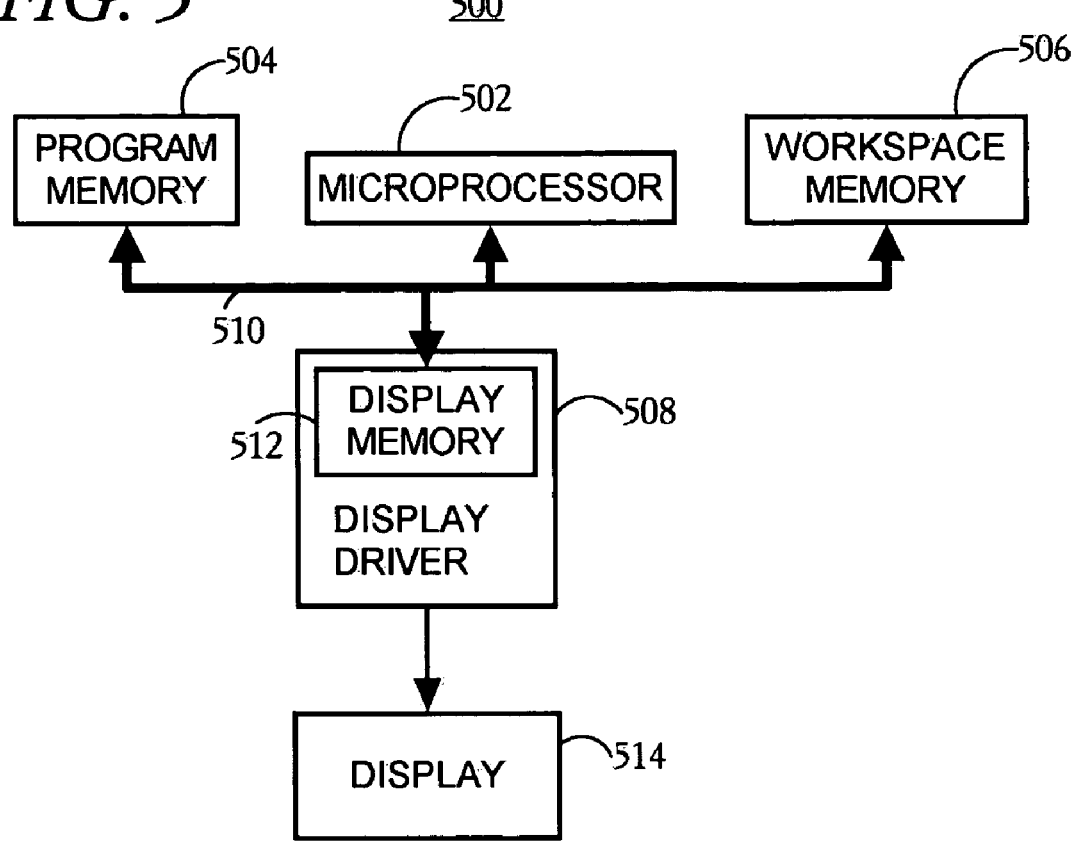

METHOD, SOFTWARE AND APPARATUS FOR EFFICIENT POLYGON RENDERING

FIELD OF THE INVENTION

The present invention relates in general to computer graphics. More particularly, the present invention relates to efficient graphics rendering.

BACKGROUND OF THE INVENTION

In the last ten years the use of handheld wireless communication devices has increased greatly. The rapid adaptation of handheld wireless communication devices has brought about a sea change in personal communications enabling ubiquitous reachability and instant access to communication networks.

Currently there is an interest in improving the functionality of handheld wireless communication devices, enabling them to be used for, among other things, more efficiently displaying multimedia content. Towards this end, there has been an interest in using vector graphics for communicating static or animated multimedia content. In a wireless communication context, vector graphics have the advantage relative to raster graphics that they require far less bytes to encode. Consequently, vector graphics demand far less bandwidth from wireless communication systems. Unfortunately, there is a trade off, to wit, the efficient encoding of vector graphics implies more computational effort to decode the vector graphics and produce viewable images therefrom. The latter process is known as rendering. The increased computational cost of rendering vector graphics is particularly problematic in the case of handheld wireless communication devices in as much as these devices are operated on batteries of limited size and increased computational cost engenders increased battery drain.

Thus, there is in general, a need for more efficient vector graphics decoding methods software and apparatus.

BRIEF DESCRIPTION OF THE FIGURES

The present invention will be described by way of exemplary embodiments, but not limitations, illustrated in the accompanying drawings in which like references denote similar elements, and in which:

FIG. 5 is a block diagram of an apparatus that functions according to one or more programs that embody the flowchart shown in FIGS. 2-3 and variations thereof.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
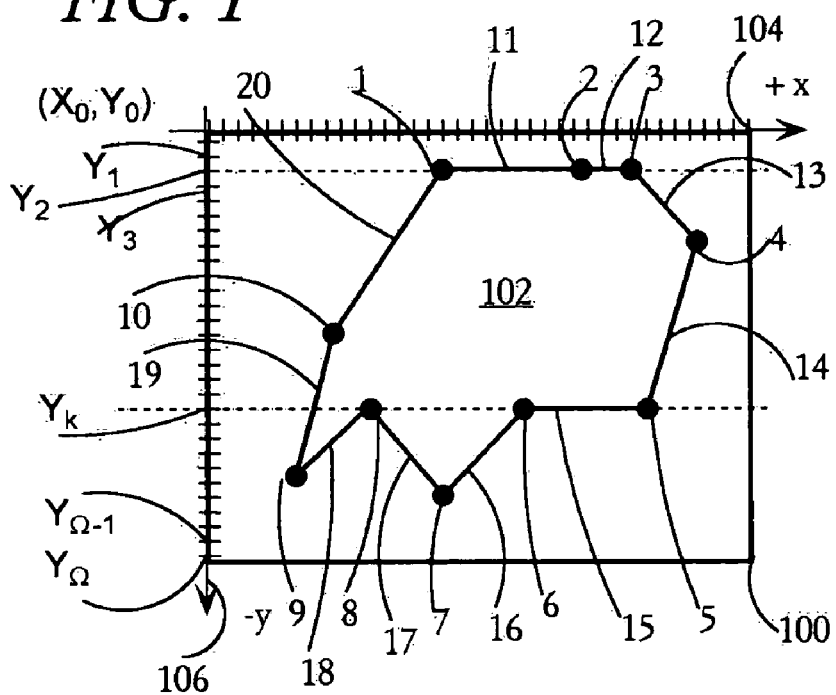
FIG. 1 shows a first viewport with an example of a polygon that is processed according to the flowchart shown in FIGS. 2-3.

FIG. 1 shows a first viewport 100 with an example of a first polygon 102 that is processed according to the flowchart shown in FIGS. 2-3 as will be described further below. The viewport 100 is a software defined area of a display. The viewport 100 may for example be controlled by a particular software application. A positive x axis 104, and a negative y axis 106 define coordinates within the viewport 100. Alternatively, a negative x axis is used in lieu of the positive x axis 104 and/or a positive y axis is used in lieu of the negative y axis 106. Given the digital nature of computer graphics, the x-axis 104 and the y-axis 106 are discrete. A number of discrete ordinate values $Y_0$, $Y_1$, $Y_2$, $Y_3$, $Y_1$, $Y_k$, $Y_{\Omega-1}$, $Y_\Omega$, are labeled on the y-axis 106.

A first polygon 102 displayed in the viewport 100 comprises a plurality of vertices which are, in clockwise order from the upper left hand corner, a first vertex 1, a second vertex 2, a third vertex 3, a fourth vertex 4, a fifth vertex 5, a sixth vertex 6, a seventh vertex 7, an eighth vertex 8, a ninth vertex 9 and a tenth vertex 10. The first polygon 102 also comprises a plurality of edges which are in clockwise order starting the first vertex 1, a first edge 11, a second edge 12, a third edge 13, a fourth edge 14, a fifth edge 15, a sixth edge 16, a seventh edge 17, an eight edge 18, a ninth edge 19 and a tenth edge 20.

Figure 2:
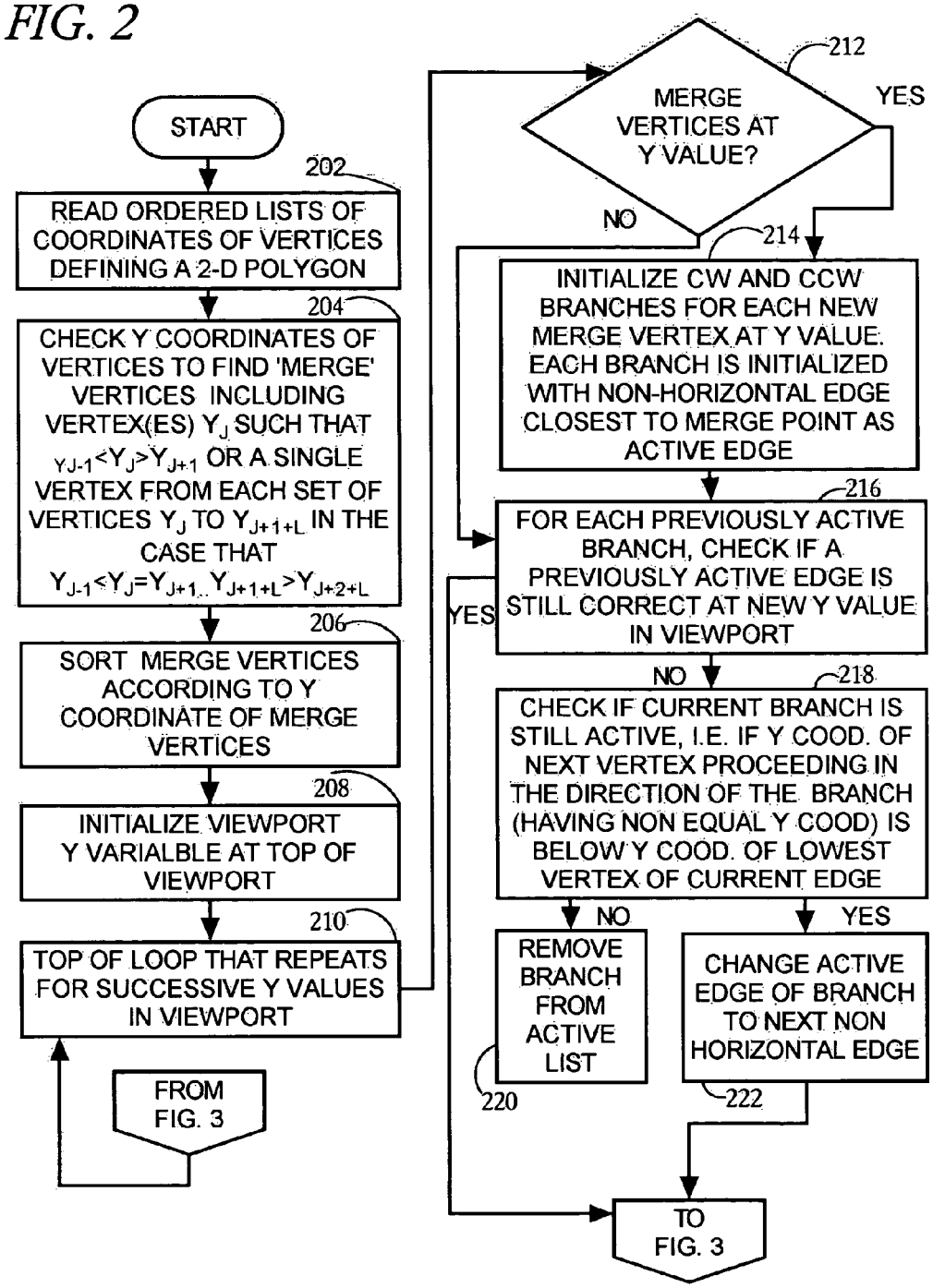
FIG. 2 is a first part of a flowchart of a program for rendering a polygon.
Figure 3:
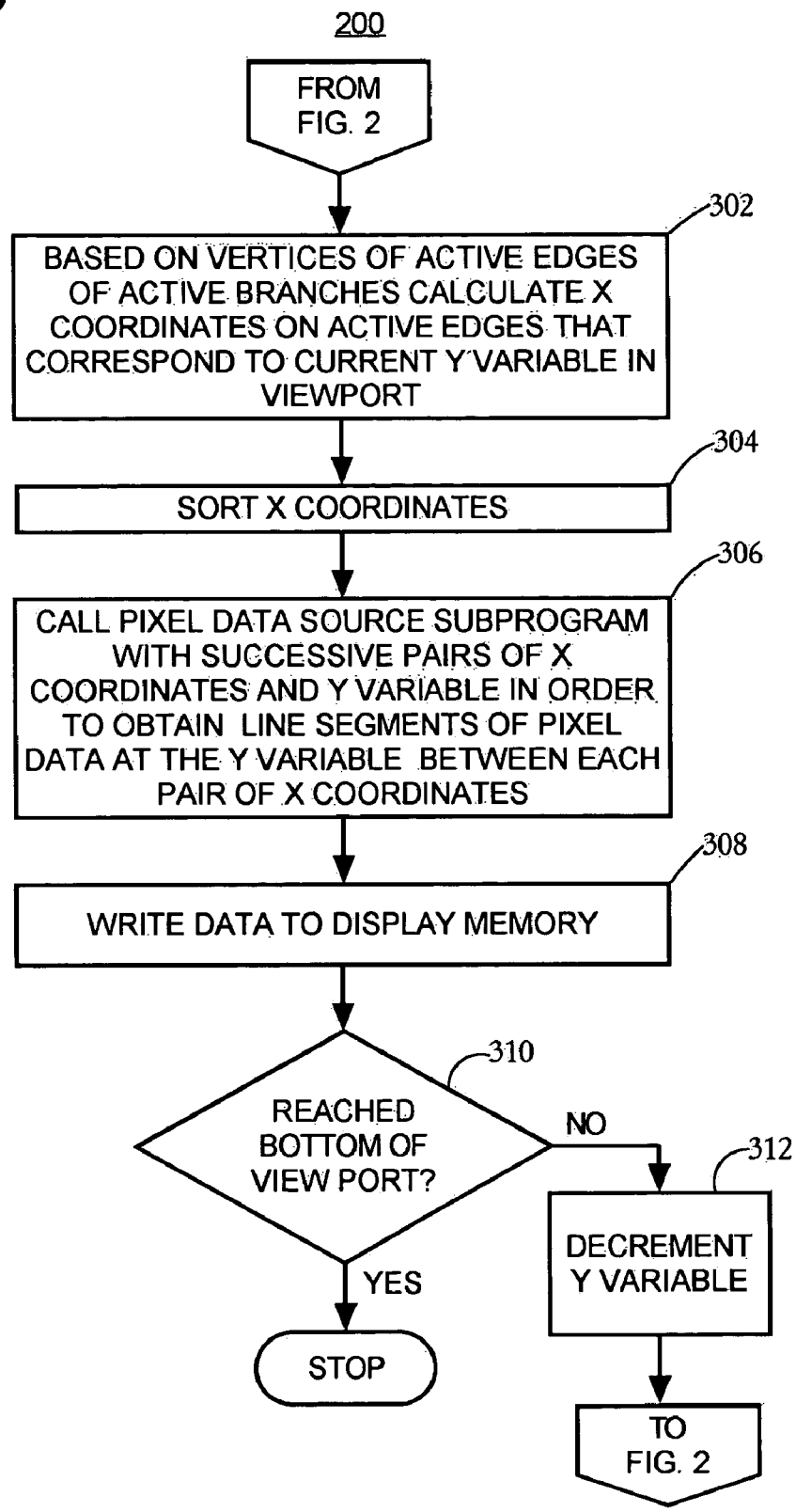
FIG. 3 is a second part of the flowchart begun in FIG. 1.

FIG. 2 is a first part of a flowchart of a program for rendering a polygon such as the polygon 102 shown in FIG. 1 and FIG. 3 is a second part of the flowchart begun in FIG. 2. Referring to FIG. 2, in block 102 one or more ordered lists of coordinates of vertices that define a polygon (e.g., 102, FIG. 1) are read. According to one alternative, a first ordered list includes x coordinates of vertices of the polygon, and a second ordered list includes y coordinates of vertices of the polygon. According to a second alternative, x coordinates and y coordinates alternate in a single list. Alternatively, another type of data structure is used to store the coordinates of the vertices of the polygon. In specifying a polygon the order of the coordinates is important, because successive vertices in an ordered arrangement of vertex coordinates are assumed to be connected by an edge of the polygon. Changing the order of the vertices will therefore delete certain edges and add other edges.

In order to define a closed polygon an ordered arrangement of vertices, whether it be a single list or two lists is assumed to be circular, which is to say, that a last vertex is assumed to be connected to the first vertex. In other words if a number N vertices are given to specify a polygon the Nth vertex is assumed to be connected to the first vertex by an edge. In a programming context and in the context of the inequalities given below if adding a number k to a number j that identifies a jth vertex, in order to accesses another vertex that is k places beyond the jth vertex results in a number j+k that exceeds the number N of vertices, one can use the remainder after dividing j+k by N to correctly specify a vertex in an array of N vertexes labeled 1 to N that is treated as a circular array. Also, if subtracting k from j to access another vertex that is k places preceding the jth vertex results in a number j−k that is less than one, then that number j−k can be subtracted from N to obtain an index that correctly specify a vertex in the array of N vertices labeled 1 to N that is treated as circular.

In block 104 the y coordinates of vertices of the polygon are used to identify special vertices which are referred to herein below as 'merge' vertices. Either of two criteria will qualify a vertex as a merge vertex. The first criteria is that y coordinate of a prospective merge vertex is above the y coordinate of both of its neighbors. The requirement of the first criteria can be expressed as:

$$Y_{J-1} < Y_J > Y_{J+1} \quad \text{INEQUALITY ONE:}$$

where, $Y_j$ specifies a y coordinate of a prospective merge vertex;
$Y_{j-1}$ specifies a y coordinate of a vertex preceding the prospective merge vertex in a ordered list of vertices of a polygon;
$Y_{j+1}$ specifies a y coordinate of a vertex following the prospective merge vertex in a ordered list of vertices of a polygon; and
conventional less than < and greater than > inequality signs are used.

The second criteria applies in the case that there is a sequence of two or more vertices (including a prospective merge vertex) that have equal y values. In the latter case, the second criteria requires that a first vertex immediately preceding the sequence of two or more vertices, and a second vertex immediately following the sequence of two or more vertices, both have y values that are less than the common y value of the sequence of vertices including the prospective merge vertex. A necessary condition for the second criteria is that there be a sequence of vertices having y coordinate values that meet the following inequality:

$$Y_{J-1} < Y_J = Y_{J+1} \ldots Y_{J+1+L} > Y_{J+2+L} \quad \text{INEQUALITY TWO:}$$

where, $Y_J$ through $Y_{J+1+L}$ specify y coordinates of a sequence of L+2 vertices which have equal y coordinates;
$Y_{J-1}$ specifies the y coordinate of a vertex preceding the sequence of L+2 vertices;
$Y_{J+2+L}$ specifies the y coordinate of a vertex following the sequence of L+2 vertices;
L can be zero or integer valued; and
conventional less than < and greater than > inequality signs are used.

Note that in the case in which the second criteria applies and there is a sequence of two or more vertices having equal y coordinates, any of the vertices (e.g. from $Y_J$ to $Y_{J+1+L}$ inclusively) in the sequence of vertices having equal y coordinates will meet the second criteria. However, only one of those the vertices is chosen as a merge vertex. Which one of the vertices is chosen, can be based on which has the highest x coordinate, which has the lowest x coordinate, some other criteria, or, in fact randomly. Choosing more than one in this context would be redundant.

In the first polygon 102 the eighth vertex 8 qualifies as a merge vertex under the first criteria. Also in the first polygon 102, in as much as the first vertex 1, the second vertex 2 and the third vertex 3 have equal y coordinates, in particular y coordinate values of $Y_2$, one of the first vertex 1, the second vertex 2, and the third vertex 3 can be chosen as a merge vertex.

The process of applying the first and second criteria for finding the merge vertices has a computational cost that is linear in terms of the number N of vertices in a polygon. This is a relatively low computational cost, which is important for the reasons set forth in the Background of the Invention section.

In block 206 the merge vertices are sorted according to their y coordinates. In as much as the number of merge vertices is lower than the total number of vertices, sorting only the merge vertices has a relatively low computational cost compared to sorting all of the vertices. In implementing block 206 an array of indices or pointers to the coordinates of the merge vertices can be sorted according to the y coordinates of the merge vertices, rather than sorting the merge vertices themselves. The sorted array of indices or pointers will allow the merge vertices to be accessed in order according to their y coordinates.

In block 208 a y variable that identifies a row in a viewport is initialized at the top of the viewport. For example in the case of the viewport 100 shown in FIG. 1, according to block 208 the y variable is initialized at $Y_0$. Block 210 is the top of loop that repeats for successive values of the y variable initialized in block 208. For each pass through the loop that begins in block 210 the y variable is decremented so as to scan through the viewport row by row. Alternatively the y variable is initialized at the highest vertex of any polygon in the viewport.

After entering the loop block 212 is reached. Block 212 is a decision block the outcome of which depends on whether any merge vertices having y coordinates equal to the current value of the y variable are found. In executing block 212 it is efficient to take advantage of the fact that the merge vertices are sorted by comparing the current value of the y variable to the y coordinate of a next merge vertex (in sorted order) which not yet been reached. If in block 212 one or more merge vertices are found, then in block 214, for each merge vertex that is found in block 212, a clockwise branch and a counterclockwise branch are initialized. Each branch starts at the merge vertex from which it spawned. Each branch includes a sequence of two or more vertices (including the merge vertex from which it spawned). Each branch includes one or more edges. For example if a sequence of N vertices 1 to N happens to specify a polygon in clockwise order in-the-large (i.e. at the scale of the whole polygon), and a kth vertex between the $1^{st}$ vertex and the Nth vertex is found to be a merge vertex, a clockwise branch that includes, at least, the kth vertex connected to a (k+1)th vertex by an edge, and a counterclockwise vertex that includes, at least, the kth vertex connected to the (k−1)th vertex will be spawned from the kth vertex.

By way of illustration, in the case of the polygon 102 shown in FIG. 1, if the first vertex 1 is chosen among the first 1, second 2 and third 3 vertices as the merge vertex (in conformance with the second criteria), then a first (clockwise) branch that starts from the first vertex 1 and includes, in sequence, the second vertex 2 the third vertex 3, the fourth vertex 4, the fifth vertex 5, the sixth vertex 6, and the seventh vertex will be spawned, and a second (counterclockwise) branch that starts from the first vertex 1 and includes, in sequence, the tenth vertex 10, and the ninth vertex 9 will be spawned. A third (clockwise) branch and a fourth (counterclockwise) branch the will be spawned from the eighth vertex 8 which is a merge vertex according to the first criteria. The third (clockwise) branch includes only the eighth edge 18 extending from the eighth vertex 8 to the ninth vertex 9. The fourth (counterclockwise) branch includes only the seventh edge 17 extending from the eighth vertex 8 to the seventh vertex 7. The criteria for terminating the branches is discussed below. Note that the sixth vertex 6 will not qualify under the second criteria as a merge vertex because the fourth edge 14 extends upward from the fifth vertex 5.

In implementing block 214 both a clockwise branch and a counterclockwise branch can be spawned by initiating one branch in which a vertex identifying index decreases from the merge vertex proceeding along the branch, and initiating another branch in which the vertex identifying index increases from the merge vertex proceeding along the branch. In other words if a kth vertex is a merge vertex one branch might include, in sequence along the branch, vertices k, (k+1), (k+2) and (k+3) and another branch extending in an opposite direction might include, in sequence along the branch, vertices k, (k−1), (k−2), (k−3) and (k−4). The full extent of the branches need not be determined when the branches are initiated. The extent of the branches will be determined dynamically as they are traversed.

When branches are initialized in block 214 they are added to a data structure (e.g., a list) that identifies active branches. When first initialized a non-horizontal edge that is closest to the merge vertex from which a particular branch spawned is set as the active edge for the particular branch. For example, when the first branch mentioned above is initialized the first edge 11 and the second edge 12 are skipped because they are horizontal and the third edge 13 is set as the active edge for the first branch. (An edge is horizontal if the y coordinates of the vertices that define the edge are equal) Likewise, when the second branch mentioned above is initialized the tenth edge 20 is set as the active edge for the second branch. The identity of each active edge for each active branch is also stored in a data structure. Note that for certain polygons more than one merge vertex can be located at a particular y coordinate.

Recall that the y variable is being decremented with each pass through the loop started in block 210. In block 216 following block 214, for each particular previously active branch, a check is made to determine if a previously active edge in the particular previously active branch is still correct at the new y value. To check if a previously active edge is still correct the y variable is compared to the y coordinates of the vertices that define the previously active edge. For the previously active edge to remain active the y variable must be within a range bounded by the y coordinates of the vertices of the previously active edge. The latter range is suitably open at one end and closed at the other. Two alternative conditions for the previously active edge to remain active can be expressed as:

$Y_K \leq Y$ VARIABLE $< Y_{K\pm 1}$     INEQUALITY THREE:

$Y_K < Y$ VARIABLE $\leq Y_{K\pm 1}$,     INEQUALITY FOUR:

where, $Y_K$ and $Y_{K\pm 1}$ are the two vertices of the previously active edge.

Note that if it is determined in block 212 that there are no merge vertices at the current value of the y variable, the flowchart 200 bypasses block 212 and goes directly to block 216.

If in block 216 it is determined that a previously active edge of a particular previously active branch is no longer an active edge, then the flowchart 200 continues with block 218. In block 218 is decision block, the outcome of which depends on whether a particular previously active branch is still active. The determination made in block 218 depends on whether a next vertex proceeding in the direction (clockwise or counterclockwise) of the branch (beyond any horizontal edges) has a y coordinate that is less than the y coordinate of the lowest vertex of the previously active edge. In other words for the branch to continue, successive vertices must have either equal or lesser y coordinates. By way of example, in proceeding along the first branch referred to above, because the fifth edge 15 is defined by two vertices having equal y coordinate $Y_K$, continuation of the first branch beyond the fourth edge 14 depends on the seventh node 7 having a lower y coordinate than that of the fifth node 5.

If it is determined in block 218 that a particular previously active branch is no longer active, then in block 220 the branch is removed from a data structure, e.g. a list, that includes active branches and no further processing of the branch occurs. If, on the other hand, it is determined in block 218 that a particular previously active branch is still active, then in block 222 an active edge for the particular previously active branch is changed to a next, non-horizontal edge along the branch.

Thereafter, processing continues with block 302 in the second part of the flowchart 200 shown in FIG. 3. Note that if it is determined in block 216 that for a particular branch the previously active edge is still active, then for that particular branch, the flowchart bypasses blocks 218-222 and jumps to block 302. In block 302 based on the vertices of the active edges of the active branches, x coordinate values on each active edge that correspond to the current value of the y variable are calculated. For an active edge defined by a first vertex that has coordinates $(X_K, Y_K)$ and a second vertex that has coordinates $(X_{K\pm 1}, Y_{K\pm 1})$, the x coordinate corresponding to the current y variable is given by:

$$X\_coordinate = X_K + (Y\text{ variable} - Y_K)*(X_{K\pm 1} - X_K)/(Y_{K\pm 1} - Y_K)$$     EQUATION ONE:

For an edge that starts at a particular value of the y variable, the x coordinate is simply the value of the vertex of the edge located at the particular value of the y variable. If a particular edge has started before a particular value of the y variable, the x coordinate at the particular value of the y variable can be calculated based on the x coordinate for the last value of the y variable. The x coordinate at a particular value of the y variable in terms of an x coordinate for the last y variable value is given by:

$$X^P = X^{P-1} + \Delta y*(X_{K\pm 1} - X_K)/(Y_{K\pm 1} - Y_K)$$     EQUATION TWO:

where, $X^P$ is the x coordinate at a particular value of the current y variable;

$X^{P-1}$ is the x coordinate at a preceding value of the y variable; and $\Delta y$ is a decrement by which the y variable is changed with each run through the loop commenced in block 210 ($\Delta y$ is typically the spacing between successive rows in the viewport).

The vertex coordinates appearing in equation two are defined above. Note that the second term in equation two is fixed for a particular edge. Therefore, a low computational cost method by which equation two is evaluated, is to evaluate the second term once for each edge and store it. Then, after the first x coordinate on a given edge has been determined, each successive x coordinate value is calculated by adding the stored value of the second term in equation two to a preceding x coordinate value.

In block 304 the x coordinates on all the active edges at a particular value of the y variable are sorted. In block 306 a pixel data source subprogram is called with successive pairs of the x coordinates on the active edges which were computed in block 302 and sorted in block 304 and the y variable. The pixel data source subprogram returns pixel data for each horizontal line segment extending between each pair of x coordinates at the y coordinate equal to the current value of the y variable. The pixel data fills in the polygon, but does not get written to the area outside the polygon. A background color, or other graphics, will be written to the area of the viewport (e.g., 100) outside the polygon. The nature of the pixel data and correspondingly the pixel data source subprogram that supplies the data can vary. In one case the pixel data subprogram simply specifies a uniform color for the inside of the polygon. In a second case, the pixel data subprogram can output procedurally generated computer graphics. In a third case the pixel data subprogram can output data, i.e. digital images. In a fourth case which is in some sense intermediate to the latter two, the pixel data source subprogram can generate a graphical representation of data, e.g. a 2-d or 3-d plot of technical data. The internal details of the pixel data source programs are beyond the focus of this description.

In block 308 the pixel data obtained in block 306 is written to a display memory (e.g., 512, FIG. 5). A display driver (e.g., 508, FIG. 5) will use the pixel data to drive a display, and thus present the pixel data within a polygon on the display.

Block 310 is a decision block, the outcome of which depends on whether the y variable has reached the bottom of the viewport (e.g. 100). If not then in block 312 the y variable is decremented and the flowchart 200 loops back to block 210 and from there runs through the loop that commences at block 210 again. If on the other hand, it is determined in block 310 that the bottom of the viewport (e.g. 100) has been reached, then the flowchart 200 terminates.

The method which has been described above, identifies merge vertices based on the y coordinate and works form the top down incrementally decreasing the y variable that designates a row of the viewport. It will be apparent to one skilled in the art that alternatives are possible. Rather than using the y coordinate the x coordinate can be used to identify merge vertices. In the latter case it is appropriate to replace the y variable that designates a row of the viewport with an x variable that designates a column of the viewport. In the case that the y variable is used to identify merge vertices, the inequalities used to identify merge points in block 204 can be reversed, and the y variable can be initialized at the bottom of the viewport (or lowest vertex of the polygon) and incrementally increased. In the case that an x variable is used to identify merge vertices, the inequalities presented in block 204 (with x substituting for y) can be used as presented or the inequalities presented in block 204 (with x substituting for y) can be reversed. In the former case it is appropriate to initialize the x variable at the highest value for the viewport (or at least at the highest x coordinate of the polygon), and in the latter case it is appropriate to initialize the x variable at the lowest value for the viewport (or at least at the lowest x coordinate of the polygon).

Figure 4:
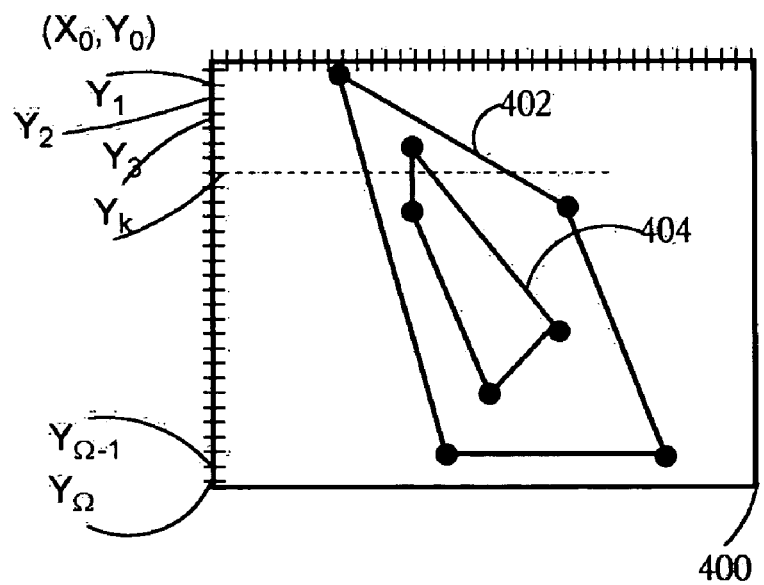
FIG. 4 is a second viewport with an example of a pair of nested polygons that are processed according to a variation of the flowchart shown in FIGS. 2-3.

FIG. 4 is a second viewport 400 with an example of a pair of nested polygons that are processed according to a variation of the flowchart shown in FIGS. 2-3. The pair of nested polygons includes a first polygon 402, and a second polygon 404 nested within the first polygon 402. For certain applications it is desirable to render an area between the first polygon 402 and the second polygon 404 with pixel data from a particular source while reserving an area outside the first polygon 402, and an area in side the second polygon 404 for other pixel data. FIG. 4 illustrates the simplest case of polygon nesting. In more complicated cases multiple polygons are nested in a polygon. Nested polygons can be handled by a variation of the processing shown in FIG. 4. To handle nested polygons, blocks 202 to 302 in the flowchart 200 can be executed for each polygon separately, blocks 304, 306 can be executed for all the active edges in all the polygons together, block 308 can then be executed with the pixel data resulting from executing block 306, and then blocks 310, 312 executed. Alternatively, the merge vertices of all the polygons can be put together in one data structure and sorted together in block 206, and 212 can be performed using a resulting combined sorted arrangement of merge vertices.

FIG. 5 is a block diagram of an apparatus 500 that functions according to one or more programs that embody the flowchart shown in FIGS. 2-3 and variations thereof. The apparatus 500 comprises a microprocessor 502, a program memory 504, a workspace memory 506, and a display driver 508 coupled together by a signal bus 510. The display driver 508 includes a display memory 512. The display driver 508 is also coupled to a display 514. The program memory 508 is used to store program instructions of one or more programs that embody the flowchart 200, which are executed by the microprocessor 502. The program memory 508 is a form of computer readable medium. The workspace memory 504 is used by the microprocessor 502 as temporary storage in executing programs. In executing one or more programs that embody the flowchart 200, pixel data is written by the microprocessor 502 to the display memory 512. The display driver 508 then uses the pixel data to drive the display 514. Alternatively, rather than using a programmed processor to implement the method shown in the flowchart 200, the method is carried out by an Application Specific Integrated Circuit (ASIC).

Programs embodying the invention or portions thereof may be stored on a variety of types of computer readable media including optical disks, hard disk drives, tapes, programmable read only memory chips. Network circuits may also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of rendering one or more polygons comprising:

reading an ordered plurality of coordinates of an ordered plurality of vertices that define a polygon;

selecting one or more special vertices from the ordered plurality of vertices, based on two alternative criteria, including:

a first criteria which specifies that there are two vertices that are immediately adjacent a candidate special vertex in the ordered plurality of vertices for which a first coordinate satisfies an inequality relation with respect to the first coordinate of the candidate special vertex; and a second criteria which specifies that in a case that there is a sequence of two or more vertices that have an equal first coordinate value and there is a first vertex preceding the sequence and a second vertex following the sequence that have first coordinate values that satisfy the inequality relation with respect to the equal first coordinate value of the sequence, one of the sequence is selected as a special vertex;

initiating a variable corresponding to the first coordinate to a value that does not satisfy the inequality relation with respect to the first coordinate of any of the ordered plurality of vertices that define the polygon;

incrementally changing the value of the variable to move through the polygon;

at each particular value of the variable:
  checking if any special vertices have first coordinate values that correspond to the particular value of the variable;
  in case one or more special vertices that have first coordinates values corresponding to the particular value of the variable are found, for each particular special vertex that is found, initializing a clockwise-direction branch and a counterclockwise-direction branch extending from the particular special vertex, wherein each branch comprises a sequence of one or more edges, each connecting two vertices of the polygon, and wherein an edge in each branch closest to the particular special vertex of each branch, that is not defined by two vertices having equal first coordinates, is initially set as active within each branch;
  for each particular previously active branch checking if a previously active edge is still active, by checking if the previously active edge spans a range of the first coordinate that includes a current value of the variable;
  in case the previously active edge is no longer active checking if the particular previously active branch is still active by checking if a next vertex, proceeding in a direction of the particular previously active branch, for which the first coordinate is not equal to the first coordinate of a last vertex of the previously active edge furthest from a particular special vertex at which the particular previously active branch starts has a first coordinate that satisfies the inequality relation with respect to the last vertex of the previously active edge;
  in case the particular previously active branch is no longer active, ceasing to process the previously active branch;
  in case the previously active edge is no longer active, but the particular previously active branch is still active, changing an active edge for the particular previously active branch to a next edge along the particular previously active branch that has a vertex that satisfies the inequality relation with respect to the last vertex of the previously active edge; and
  computing a second coordinate value for each active edge in each active branch corresponding to the current value of the variable.

2. The method of rendering one or more polygons according to claim 1 further comprising:
  at each particular value of the variable, sorting the second coordinate values for all the active edges, taking the second coordinate values in sorted order, in pairs, and writing pixel data for pixels between second coordinate values in each pair to a display driver.

3. The method of rendering one or more polygons according to claim 1 comprising:
  repeating processing specified in claim 1 for a first polygon and a second polygon that is located within the first polygon; and
  at each particular value of the variable, sorting the second coordinate values for all the active edges in the first polygon and the second polygon together, taking the second coordinate values from the first polygon and the second polygon in sorted order, in pairs, and writing pixel data for pixels between second coordinate values in each pair to a display driver.

4. The method of rendering one or more polygons according to claim 1 wherein:
  the first coordinate is a y coordinate;
  the second coordinate is an x coordinate;
  the inequality includes a less than sign;
    whereby, according to the first criteria vertices immediately adjacent the candidate special vertex are required to have y coordinate values that are less than a y coordinate value of the candidate special vertex;
    whereby, according to the second criteria the first vertex and the second vertex are required to have y coordinate values that are less than the y coordinate value of the candidate special vertex; and
    whereby, the variable corresponding to the first coordinate is initiated at a top of the polygon or above the polygon.

5. The method of rendering one or more polygons according to claim 1 further comprising:
  sorting the one or more special vertices according to the first coordinate.

6. An apparatus comprising:
  a display, a display driver coupled to said display, one or more processors coupled to said display driver for supplying pixel to be displayed on said display to said display driver, a memory coupled to said one or more processors, wherein said memory stores a program for execution by said one or more processors;
  wherein said one or more processors are programmed by said program to:
  read an ordered plurality of coordinates of an ordered plurality of vertices that define a polygon;
  select one or more special vertices from the ordered plurality of vertices, based on two alternative criteria, including:
    a first criteria which specifies that there are two vertices that are immediately adjacent a candidate special vertex in the ordered plurality of vertices for which a first coordinate satisfies an inequality relation with respect to the first coordinate of the candidate special vertex; and
    a second criteria which specifies that in a case that there is a sequence of two or more vertices that have an equal first coordinate value and there is a first vertex preceding the sequence and a second vertex following the sequence that have first coordinate values that satisfy the inequality relation with respect to the equal first coordinate value of the sequence, one of the sequence is selected as a special vertex;
  sort the one or more special vertices according to the first coordinate;
  initiate a variable corresponding to the first coordinate to a value that does not satisfy the inequality relation with respect to the first coordinate of any of the ordered plurality of vertices that define the polygon;
  incrementally change the value of the variable to move through the polygon;
  at each particular value of the variable:
    check if any special vertices have first coordinate values that correspond to the particular value of the variable;
    in case one or more special vertices that have first coordinates values corresponding to the particular value of the variable are found, for each particular special vertex that is found, initialize a clockwise-direction branch and a counterclockwise-direction branch extending from the particular special vertex, wherein each branch comprises a sequence of one or more edges, each connecting two vertices of the polygon, and wherein an edge in each branch closest to the particular special vertex of each branch, that is not defined by two vertices having equal first coordinates, is initially set as active within each branch;

for each particular previously active branch check if a previously active edge is still active, by checking if the previously active edge spans a range of the first coordinate that includes a current value of the variable;

in case the previously active edge is no longer active check if the particular previously active branch is still active by checking if a next vertex, proceeding in a direction of the particular previously active branch, for which the first coordinate is not equal to the first coordinate of a last vertex of the previously active edge furthest from a particular special vertex at which the particular previously active branch staffs has a first coordinate that satisfies the inequality relation with respect to the last vertex of the previously active edge;

in case the particular previously active branch is no longer active, cease to process the previously active branch;

in case the previously active edge is no longer active, but the particular previously active branch is still active, change an active edge for the particular previously active branch to a next edge along the particular previously active branch that has a vertex that satisfies the inequality relation with respect to the last vertex of the previously active edge; and computing a second coordinate value for each active edge in each active branch corresponding to the current value of the variable.

7. The apparatus according to claim 6 wherein said one or more processors are programmed by said program to:

at each particular value of the variable, sort the second coordinate values for all the active edges, take the second coordinate values in sorted order, in pairs, and write pixel data for pixels between second coordinate values in each pair to the display driver.

8. The apparatus according to claim 6 wherein:

the first coordinate is a y coordinate;

the second coordinate is an x coordinate;

the inequality includes a less than sign;

whereby, according to the first criteria vertices immediately adjacent the candidate special vertex are required to have y coordinate values that are less than a y coordinate value of the candidate special vertex;

whereby, according to the second criteria the first vertex and the second vertex are required to have y coordinate values that are less than the y coordinate value of the candidate special vertex; and whereby, the variable corresponding to the first coordinate is initiated at a top of the polygon or above the polygon.

9. The apparatus according to claim 6 wherein said one or more processors are programmed by said program to:

sorting the one or more special vertices according to the first coordinate.

* * * * *